(No Model.)
C. VANTREES.
TIRE TIGHTENER.
No. 498,415. Patented May 30, 1893.
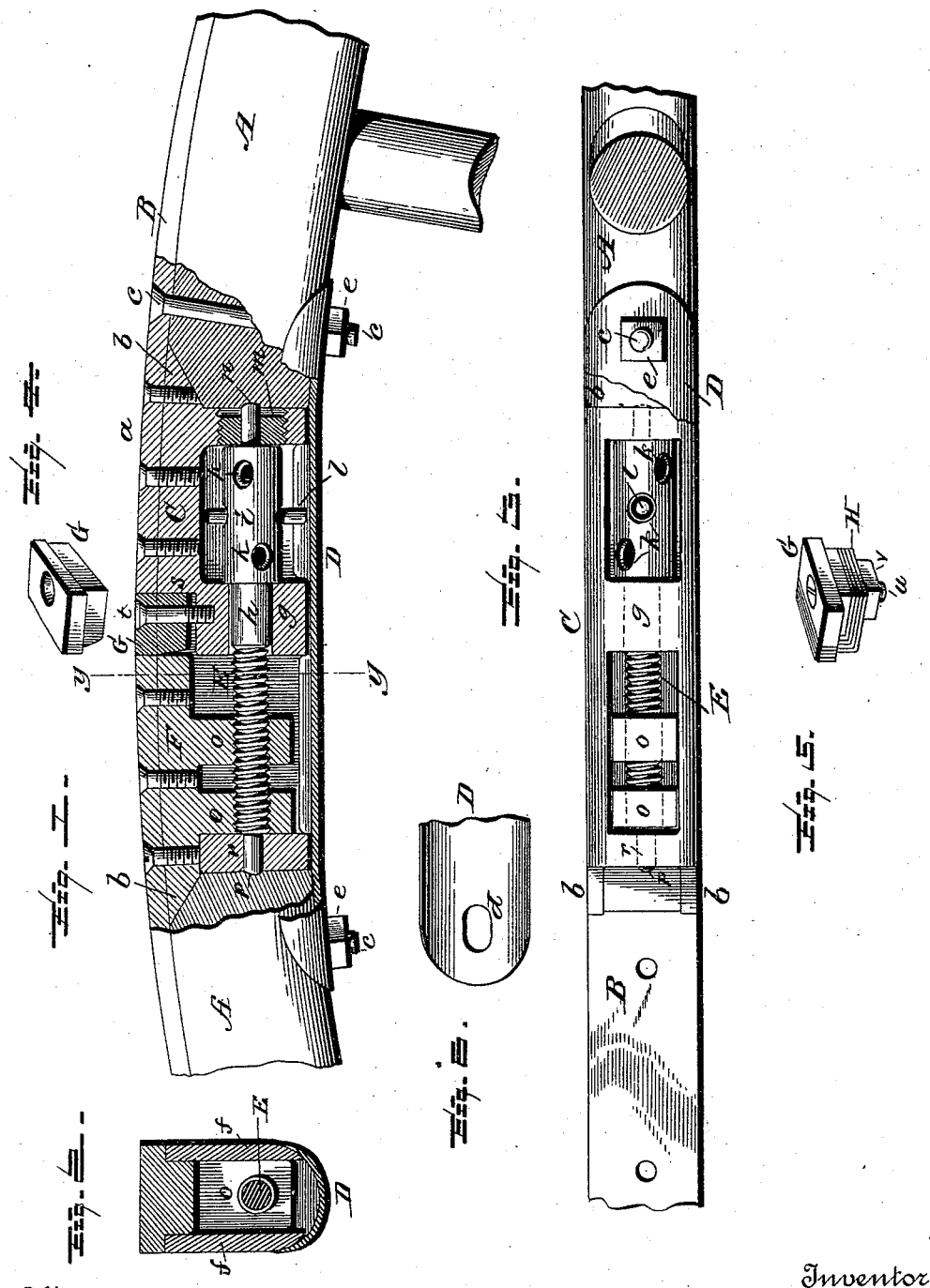
Witnesses
L. C. Hills.
B. G. Warren
Inventor
Cevanus Vantrees
per Chas. N. Fowler
Attorney

UNITED STATES PATENT OFFICE.

CEVANUS VANTREES, OF BUTLER, MISSOURI.

TIRE-TIGHTENER.

SPECIFICATION forming part of Letters Patent No. 498,415, dated May 30, 1893.

Application filed December 29, 1892. Serial No. 456,717. (No model.)

*To all whom it may concern:*

Be it known that I, CEVANUS VANTREES, a citizen of the United States, residing at Butler, in the county of Bates and State of Missouri, have invented certain new and useful Improvements in Tire-Tighteners; and I do hereby declare that the following is a full, clear, and exact description of the same, reference being had to the annexed drawings, making a part of this specification, and to the letters of reference marked thereon.

The present invention has for its object to provide a device for tightening tires that will be a part of the wheel and always ready and convenient whereby any one can quickly and effectively tighten the tire without the necessity of going to a blacksmith shop or requiring the services of any one skilled in the art, which objects are attained by the construction substantially as shown in the drawings and hereinafter described and claimed.

Figure 1 of the drawings represents a portion of the rim of a vehicle wheel, partly in section to show the construction of my improved device; Fig. 2 a cross section taken on line $y\ y$ of Fig. 1; Fig. 3 an under plan view showing the felly-plate partly broken away; Fig. 4 a detail view in perspective of the bearing-block against which the ends of the tire come in contact; Fig. 5 a similar view of the bearing-block showing a modification thereof. Fig. 6 represents a detail view of one end of the felly-plate to show the elongated slot therein.

In the accompanying drawings A represents the fellies which may be of the usual construction and together constitute the rim of the wheel, and to the fellies is secured by screws or bolts or other preferred means, the usual tire B. At any point around the rim of the wheel between the fellies, is left a space in which is located a hollow metal bracket C to which one end of the tire is suitably fastened, as shown at $a$, screws being considered the most convenient means of attaching the ends of the tire to the device.

The bracket C is cast or otherwise provided with inclined or wedge shaped flanges $b$ extending from the ends thereof and bear upon correspondingly formed seats on the inner ends of the fellies A, whereby a perfectly tight and secure fit is obtained between the ends of the fellies and bracket. The bracket as will be seen, takes the place of a felly upon the rim of the wheel.

The bracket C is open at its under side as shown in Fig. 3 but is covered by a felly cap or plate D which is held in place by the bolts $c$ extending through the fellies and tire and through elongated slots $d$ in one or both ends of the plate, nuts $e$ engaging the screw threaded ends of the bolts upon the under side of the plate.

The elongated slot or slots in the felly-plate enable the rim of the wheel to be contracted in the act of tightening the tire without in any manner affecting the position of the plate.

The bracket C is cast with sides $f$ which correspond with the sides of the fellies A when the bracket is in position between them and is also cast with the guide $g$ for the smooth portion of the screw threaded rod E, as shown at $h$. The head $i$ of the screw rod has a plurality of holes $k$ to receive a short pin $l$ for the purpose of turning it and the screw rod when in the act of tightening the tire, or any other suitable means may be provided, the pin also serving to prevent the head from turning back and therefore acts as a lock to the screw-rod after the tire is tightened.

In one end of the bracket C is a screw threaded opening in which is located a nut $m$ which nut receives the bearing pin $n$ upon the end of the head of the screw-rod.

Working in the hollow bracket C and between the sides $f$ thereof, is the plate F cast with one or more depending nuts $o$ with which engages the screw threaded rod E. The end of the rod terminates in a guide-pin $p$ having its bearing in the end of the bracket as shown at $r$, guide pins as will be seen being on both the ends of the tightening device, viz: on the end of the screw rod and on the end of the head $i$, thus keeping the rod in a true line and insuring a perfect action thereof.

The bracket C at its upper side is formed with an offset as shown at $s$, and between this offset and the end of the plate F is a bearing-block G to fill the space between them. The plate F is suitably connected to the under side of the end of the tire and by turning the screw threaded rod E in the proper direction the plate with the tire attached will be drawn in toward the opposite felly, thus tightening the tire upon the rim of the wheel.

Previous to the tightening of the tire as above described, the block G is first removed to allow space enough for the desired tightening, and after the tightening has been completed, the sides of the block are filed off to reduce its thickness sufficient to fit the reduced space between the inner end of the plate F and the tire to which it is connected, and the offset s, after which the block is replaced and connected in place by a screw t or any other preferred means.

In place of filing the sides of the block away as above described, its thickness can be reduced by providing said block with a plurality of plates H connected together and to the block by the screw u and nut v, or the same screw may be used which connects the block to the bracket.

When it is found necessary to reduce the thickness or width of the block one or more of the plates may be removed as necessity would require. These plates are of right angle shape so as to embrace both the bottom and sides of the block so that they can be more conveniently connected thereto.

There may be many changes or modifications made in the details of construction and still come within the scope of my invention, and I reserve the right to make such changes or modifications as would come within ordinary mechanical skill.

Having now fully described my invention, what I claim as new, and desire to secure by Letters Patent, is—

1. In a tire tightener, the hollow metal bracket C, the plate F having one or more stationary nuts o, the interposed bearing block G, and the screw threaded take-up rod E having at its ends guide pins, and the bracket r and adjustable nut m to form bearings therefor, substantially as and for the purpose set forth.

2. In a tire tightener, the bracket C and plate F, the screw threaded take-up rod E engaging therewith, and the interposed block G having a plurality of detachable right angle plates H, substantially as and for the purpose described.

In testimony that I claim the above I have hereunto subscribed my name in the presence of two witnesses.

CEVANUS VANTREES.

Witnesses:
 J. C. VANTREES,
 ROBERT H. ABBOTT.